(No Model.)
B. F. HACKETT & J. P. McLARTY.
BALING PRESS.
No. 508,703. Patented Nov. 14, 1893.
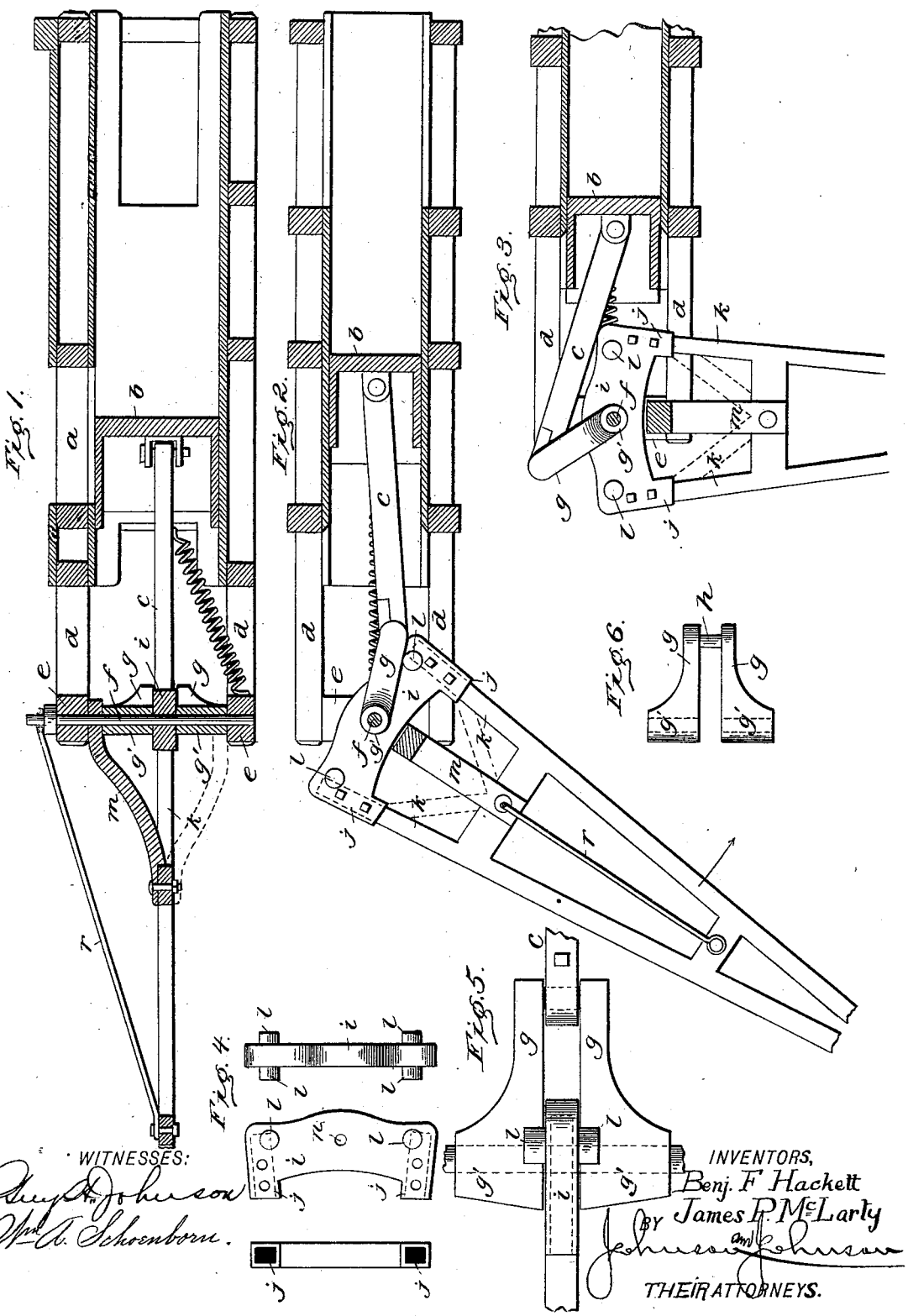
WITNESSES:
Aug. P. Johnson
Wm. A. Schoenborn.
INVENTORS,
Benj. F. Hackett
James P. McLarty
BY Johnson & Johnson
THEIR ATTORNEYS.

UNITED STATES PATENT OFFICE.

BENJAMIN F. HACKETT AND JAMES P. McLARTY, OF HACKETT CITY, ARKANSAS.

BALING-PRESS.

SPECIFICATION forming part of Letters Patent No. 508,703, dated November 14, 1893.

Application filed February 3, 1893. Serial No. 460,881. (No model.)

*To all whom it may concern:*

Be it known that we, BENJAMIN F. HACKETT and JAMES P. MCLARTY, citizens of the United States, and residents of Hackett City, in the county of Sebastian and State of Arkansas, have invented certain new and useful Improvements in Baling-Presses, of which the following is a specification.

We have improved the baling press wherein the reversible sweep or horse lever is connected to operate a reciprocating presser within a horizontal trunk or bale-chamber, within which the bale is pressed in successive charges and in which each successive sweep of the horse lever is made to force the presser in a forward direction into the bale-chamber and to automatically release the presser for its withdrawal.

The precise improvement we have made resides in the construction and arrangement of the power device for effecting the operation of the presser by means of the reversible horse lever, as we will now particularly state in connection with the accompanying drawings, in which—

Figure 1 represents a vertical section of a baling press having our improvements. Fig. 2 is a horizontal section of the same showing the position of the horse-lever when forcing the presser inward; and Fig. 3 is a similar view showing the position of the horse-lever when the presser has been released from its forcing action and retracted. Fig. 4 shows the socket-casting of the horse-lever. Fig. 5 shows the separate loose toggle parts and their connection with the horse-lever and the presser pitman-rod to form a durable and effective power device; and Fig. 6 shows the sleeve toggle-arms of the power device.

The press box is made with the usual top feed opening $a$, is open at its delivery end, and has the usual reciprocating presser $b$ operated by a jointed pitman-rod $c$, which connects with the power device, which latter, in its particular construction, constitutes our improvement.

The frame of the press-box is open at the power end where its four longitudinal beams $d$ are connected by top and bottom cross pieces $e$ in and between which is mounted a central vertical rod $f$. On this rod a sleeved toggle-part formed of two arms $g\,g$, is loosely fitted each having a long hub bearing $g'\,g'$ on said rod so that the two hubbed arms will form a long sleeved bearing on said rod of about fourteen inches. As these bearing-arms swing loosely upon said rod, the wear upon the latter is greatly reduced, their turning movement is rendered firm and the wear action of the power is thereby made durable, which is an important consideration, as this is the part of the press which is subject to great wear. The sleeved bearing-arms are connected by a crank-pin $h$ by which they are jointed to the pitman-rod which connects them to the presser; and the horse-lever is fitted loosely upon the center rod between the sleeve bearing ends of said arms. To render this horse-lever equal to the great power required to operate the presser, it is constructed with a cross-head $i$ having a length about twice that of the sleeved bearing-arms and a width and thickness sufficient to form a socket $j$ at each end into which are firmly bolted the ends of separate timbers $k$ which are connected to form the horse-lever. At each end and on each side of this socketed cross-head are bosses $l$, co-incidently placed so as to abut against the connected ends of the sleeved bearing-arms as the horse-lever is reciprocated, to force the said sleeve bearing-arms around in a reverse movement through an arc greater than a semi-circle to allow them to be carried forward to force the presser into the box and to be free to be thrown back when forced past the dead-center, to allow the presser to be withdrawn from the bale-chamber. This arrangement of the bosses on the ends of the cross-head, brings the force of the horse-lever equally upon both the sleeved arms at their crank-pin connection so as to bring the forcing action at the end of the lever cross-head and in line with the pitman-rod and one of the side-beams of the horse lever. This gives a very nearly direct line in the forcing action of the power upon the abutting parts of the cross-head of the horse-lever, the sleeved arms and the pitman-rod of the presser. While the power is thus exerted in nearly a direct line upon the operating parts at the points of greatest resistance, the wear friction upon the central rod is so distributed by the sleeves of the bearing-arms upon the central rod as to reduce the wear to a minimum, thus saving the rod from undue wear, and preventing it from being bent between its bearing ends. The sleeve-bearing and cross-head casting with its end bosses very greatly increases the strength of the power and enhances its durability. The action of the cross-head bosses is that of a direct thrust upon the sleeve bearing-arms at their point of connection with the presser pitman and it is important to notice that such construction gives a better and more satisfactory forcing power than could be obtained by a construction that would not admit of such direct line of applying the power of a crank and pitman action. So great is the resisting force upon the tongue that its tendency is to rise up and twist as the pressure approaches its maximum, and this is so of some presses of this type to such extent as renders the labor of the horses very great. To avoid this objection and to keep the horse lever in its perfect plane of movement, we provide a brace $m$ firmly secured to the lever and engaging the central rod on which said lever swings at a point between the upper arm-sleeve-bearing and the upper cross piece of the box timbers. In this position the brace acts as a solid abutment upon the lever and upon the upper sleeve arm and renders it impossible for the lever to rise or its cross-head to twist upon the central rod, and the relation of the parts is kept in perfect working order and the parts have a strength and durability to withstand the great pressure of the toggle-power and the wear incident to the reverse movement of the horse-lever.

It will be understood that the expansion of the bale which takes place at the moment the crank-arms pass the dead-center of the toggle joint formed by the connection of the said arms with the pitman rod, will cause the crank-arms to be moved back and this movement may be reinforced by the action of a spring to fully withdraw the presser from the bale-chamber. It will also be understood that the construction of the cross-head with its end bosses gives the advantage of a free movement of the pitman-rod at its toggle connection across the rear end of the horse-lever, which gives the advantage of shortening the frame at the receiving end of the press and of a more compact arrangement of the toggle-power.

The horse-lever is preferably made like the half length of a walking-beam to give strength, and the advantage of using an iron cross head having the co-incident bosses at each end and the central hole $n$ for the central rod, is that the cross-head, the brace, the sleeved-arms, and the central rod co-operate to produce great strength in the operating parts.

A top rod $r$ connects the horse-lever with the upper end of the central rod, to supplement the supporting function of the brace for holding the lever up in its proper working plane. Instead of the top rod a second brace may connect the lever with the central rod beneath the lower sleeved arm, so that the horse-lever would be both supported and braced at points above and below the sleeved-arms, as shown in Fig. 1.

We claim as our invention—

1. In a power device for baling presses, the horse actuated lever having a cross-head formed with studs or bosses $l, l$, projecting from its opposite sides in co-incident relation, combined with the presser pitman-rod and its crank actuating arms, whereby the said studs are caused to act directly upon each of said crank arms for the purpose stated.

2. In a power device for baling presses, the cross-head formed with studs or bosses $l$ projecting from its opposite sides in co-incident relation, and having a socket $j$ at each end, in combination with the horse actuated lever, the crank arms, and the pitman-rod, as shown and for the purpose stated.

In testimony whereof we have hereunto signed this specification in the presence of witnesses.

BENJAMIN F. HACKETT.
JAMES P. McLARTY.

Witnesses:
CHARLES M. HAYS,
JESSE D. MATHIS.